Patented May 31, 1932

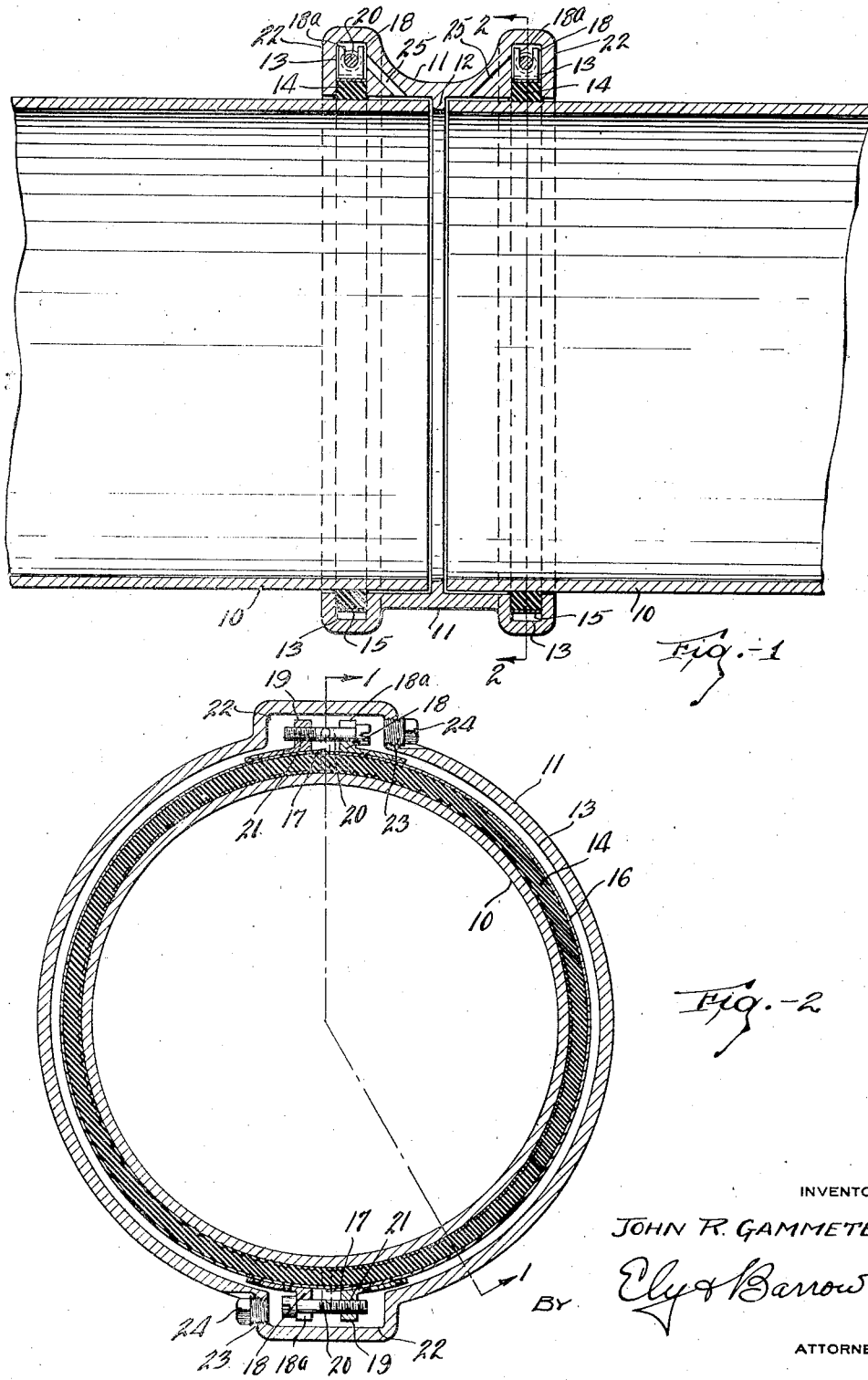

1,861,211

UNITED STATES PATENT OFFICE

JOHN R. GAMMETER, OF AKRON, OHIO

PIPE COUPLING

Application filed July 29, 1929. Serial No. 381,735.

This invention relates to pipe couplings or joints.

The general purpose of the invention is to provide a simple, inexpensive coupling or joint capable of being quickly installed or made in a pipe line and including one or more gaskets adapted to be initially sealed by mechanical means and upon which pressure in the line may be operable to assist in maintaining the seal, said mechanical means floating in the coupling whereby said coupling or joint will allow expansion, contraction, whipping and misalignment in the line without affecting the seal.

The foregoing and other objects of the invention are attained in the pipe coupling or joint disclosed in the accompanying drawings and described below. It is to be understood that the invention is not limited to the specific form thereof shown and described.

Of the accompanying drawings,

Figure 1 is a diametral section through a pipe line showing the improved joint therein; and Figure 2 is a section on line 2—2 of Figure 1.

Referring to the drawings, the numerals 10, 10 designate adjacent ends of adjoining pipe sections in a line and the numeral 11 a coupling sleeve for use in joining said pipe ends. Said sleeve 11 may have a central abutment rib 12 for the pipe ends and is formed with inner peripheral channels 13, 13 therein adjacent its ends adapted to house sealing gaskets 14, 14. The gaskets 14 are preferably of vulcanized rubber of a known compound which is not subjected to "cold flow" under pressure, such a compound being obtainable on the market under the name of "Paranite C." The gaskets 14 are preformed in annular or ring shape preferably of larger inner diameter than the inner periphery of the coupling member and somewhat greater width than the channel whereby they will be under initial compression when installed in the channels.

The means for initially sealing the gaskets on the pipe includes contracting band constructions housed in the channels, which bands may comprise a pair of flexible steel band members 15 and 16 cooperating to encircle a gasket, these members being lapped at 17, 17 and having lugs 18 and 19 on their adjacent ends, the lugs 18 being formed with slots 18ª for receiving band tightening screws 20, 20 which are threaded into apertures 21, 21 in lugs 19. The lugs 18 and 19 and band tightening screws 20 are housed in enlarged portions 22, 22 of channels 13 which have apertures 23, 23 in alignment with the heads of screws 20 to permit insertion of a screw driver or the like for which apertures removable plugs 24, 24 are provided to close the channels.

In order that fluid pressure in the pipe line may be utilized in maintaining a seal, ducts 25, 25 are provided to connect the inside of the line to the channels 13 about the gaskets 14 so that the fluid pressure in the line exerts a radial pressure on the gaskets.

It will be apparent that the contracting band construction shown herein is capable of initially drawing the gaskets about the pipe ends with a substantially uniform pressure all about the gaskets and that it is entirely free of the coupling member to float in the channels whereby it is self-adjusting to misaligned sections and whipping of a pipe line or other movements thereof under the expanding and contracting actions resulting from temperature variations. Being entirely housed within the channels, these contracting bands permit the provision of ducts connecting the fluid pressure in the line to the channels about the gaskets whereby the gaskets are fluid pressure sealed by line pressure. Yet the bands are easily accessible for tightening the gaskets to make the joint or for loosening the gaskets to break the same.

Modifications of the invention may be resorted to without departing from the spirit thereof or the scope of the appended claims.

What is claimed is:—

1. A pipe coupling or joint including a sleeve member on one pipe end and having an inner peripheral channel therein for encircling another pipe end, a resilient gasket housed in said channel, said gasket being normally of greater inner diameter than the inner diameter of the channel and of greater width than the width of the channel so as to be under initial compression when installed therein, and means housed in the channel for contracting the gasket onto a pipe end, said means including a contracting band construction comprising a pair of opposed, flexible clamping bands overlapping at their adjacent ends, the adjacent ends of said bands having lugs thereon and screws extended through one of each pair of lugs and threaded into the other for contracting said band, said lugs and screws being housed in enlarged portions of the channel, said enlarged portions having removably plugged apertures through the walls thereof aligned with said screws to permit insertion of a screw actuating tool into engagement with the screws to tighten the bands, said channel being connected to the interior of the pipe line so that pressure in the line will be effective in the channel about the gasket to seal the joint.

2. A pipe coupling or joint including a sleeve member on one pipe end and having an inner peripheral channel therein for encircling another pipe end, a resilient gasket housed in said channel, and means housed in the channel for contracting the gasket onto a pipe end, said means including a contracting band construction comprising a pair of opposed, flexible clamping bands overlapping at their adjacent ends, the adjacent ends of said bands having lugs thereon and screws extended through one of each pair of lugs and threaded into the other for contracting said band, said lugs and screws being housed in enlarged portions of the channel, said enlarged portions having screw plugged apertures through the walls thereof aligned with said screws to permit insertion of a screw actuating tool into engagement with the screws to tighten the bands, said channel being connected to the interior of the pipe line so that pressure in the line will be effective in the channel about the gasket to seal the joint.

3. A pipe coupling or joint including a sleeve member on one pipe end and having an inner peripheral channel therein for encircling another pipe end, a resilient gasket housed in said channel, and means housed in the channel for contracting the gasket onto a pipe end, said means including a contracting band construction comprising a pair of opposed, flexible clamping bands overlapping at their adjacent ends, the adjacent ends of said bands having lugs thereon and screws extended through one of each pair of lugs and threaded into the other for contracting said band, said channel being connected to the interior of the pipe line so that pressure in the line will be effective in the channel about the back of gasket to seal the joint.

4. A pipe coupling or joint including a sleeve member on one pipe end and having an inner peripheral channel therein for encircling an adjacent pipe end, a resilient gasket in the channel, and means for contracting said gasket comprising a contracting band construction including a pair of opposed band sections and means for drawing the same together, said channel being connected to the interior of the pipe line so that pressure in the line will be effective in the channel about the back of gasket to seal the joint.

JOHN R. GAMMETER.